Dec. 28, 1965  L. A. PALENCIA  3,225,738
ANIMAL CAGE AND SUPPORT APPARATUS
Filed Oct. 7, 1963  2 Sheets-Sheet 1
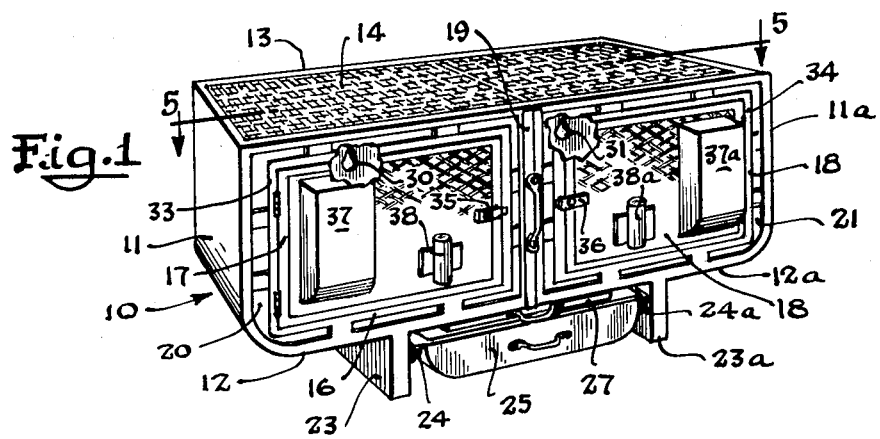
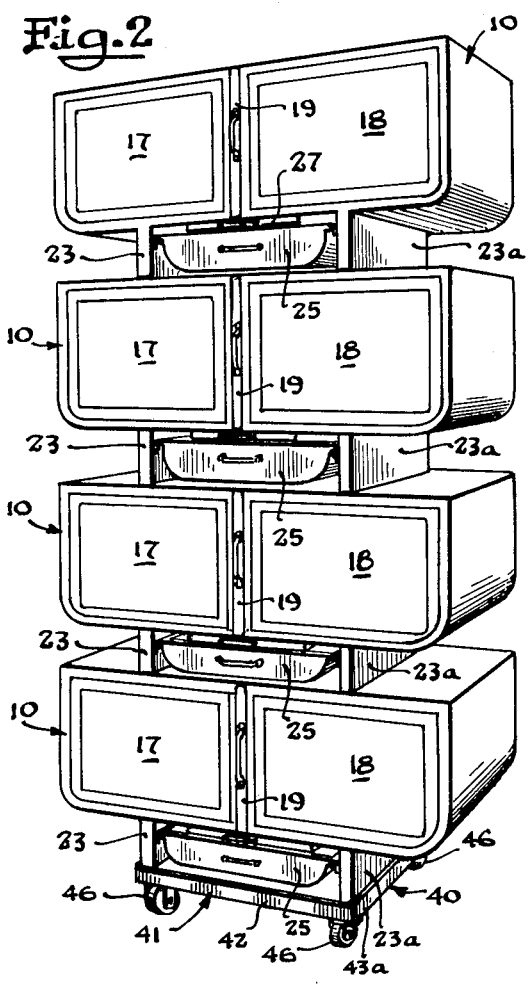
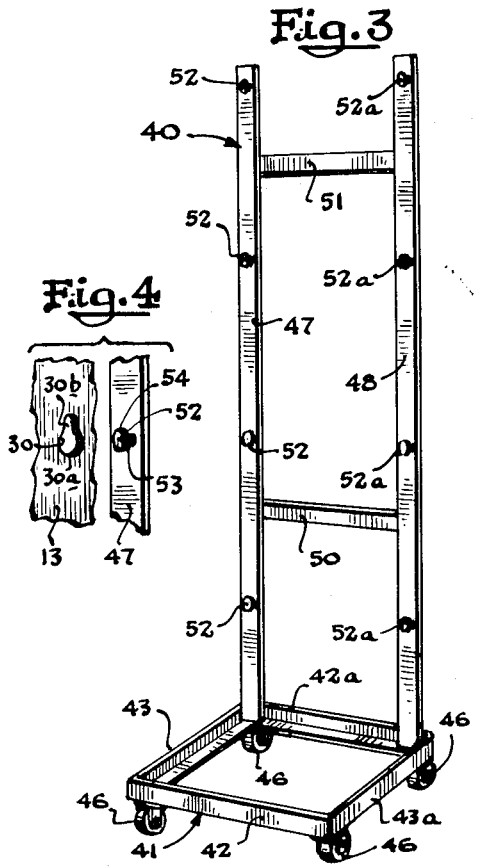
Inventor
Luis A. Palencia
By Hibben, Noyes & Bicknell
Attorneys Dec. 28, 1965    L. A. PALENCIA    3,225,738
ANIMAL CAGE AND SUPPORT APPARATUS
Filed Oct. 7, 1963    2 Sheets-Sheet 2

Inventor
Luis A. Palencia
By Hibben, Noyes & Bicknell
Attorneys

United States Patent Office 3,225,738
Patented Dec. 28, 1965

3,225,738
ANIMAL CAGE AND SUPPORT APPARATUS
Luis A. Palencia, Apartado 25247, Mexico City, Mexico
Filed Oct. 7, 1963, Ser. No. 314,332
4 Claims. (Cl. 119—17)

The present invention relates generally to improved means for confining and housing animals, and more particularly to improved animal cages and apparatus for supporting a plurality of animal cages in a more convenient and economical manner.

In research laboratories where many experimental animals must be kept, particularly where the animals are of the larger species comprising rabbits, guinea pigs, cats, dogs or monkeys, considerable space is required. Heretofore, it has generally been considered expedient in such laboratories to either stack a plurality of cages one upon the other directly on the floor of the laboratory or to place the cages on racks or shelves. When the individual cages are stacked one upon the other on the floor of a laboratory, it frequently is difficult to move a given cage or group of cages. And, where the cages are stacked on racks or shelves, considerable added expense is involved in both the cost of the racks and shelves and in maintaining the racks and shelves in a clean condition.

It is therefore an object of the present invention to provide improved animal cages and apparatus for holding animal cages which permits assembling and handling a plurality of animal cages more conveniently and economically.

It is a further object of the present invention to provide improved animal cages and apparatus for supporting a group of animal cages which eliminates using supporting racks having shelves or trackways to support the animal cages.

It is still another object of the present invention to provide improved apparatus for supporting a group of animal cages which permits readily moving a group of animal cages without individually handling the cages.

It is also an object of the present invention to provide an improved animal cage structure which can be conveniently arranged in superimposed relationship and which is freely accessible from all sides.

Other objects of the present invention will be apparent to those skilled in the art from the following detailed description, claims, and accompanying drawing wherein:

FIG. 1 is a perspective view of an animal cage of the present invention;

FIG. 2 is a perspective view of a plurality of cages of FIG. 1 in superimposed relationship supported on the apparatus of the present invention;

FIG. 3 is a perspective view of a cage support apparatus of the present invention;

FIG. 4 is a fragmentary schematic view of a detail of the cage and apparatus in the present invention;

Figure 5:
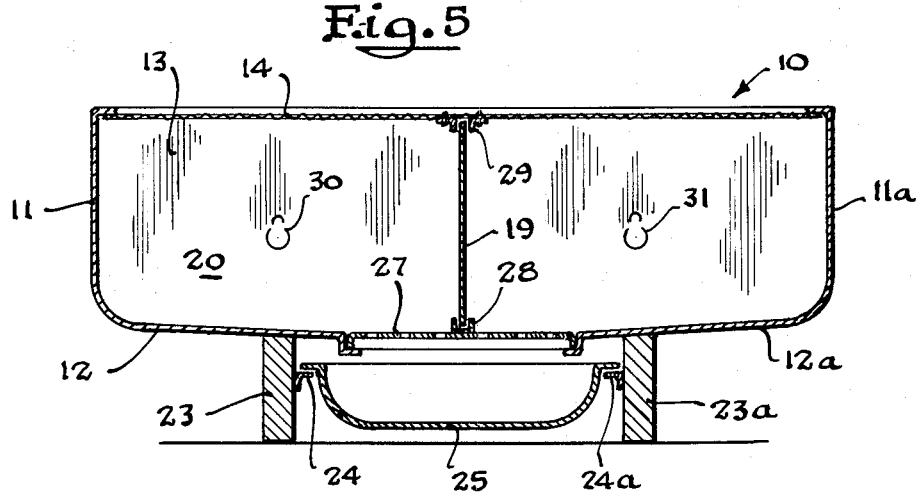
FIG. 5 is a vertical sectional view taken along the line 5—5 of FIG. 1.

In FIGS. 1, 2 and 5 of the drawing is shown an animal cage 10 illustrating one embodiment of the present invention and which is comprised of a generally rectangular body portion formed preferably by interconnected imporforate lateral wall sections 11, 11a, imperforate floor sections 12, 12a, imperforate rear wall section 13, perforated top wall section 14, and perforated from wall section 16 which is preferably formed with two hinged doors 17, 18, and having a transversely movable cage divider member 19 mounted intermediate the lateral walls 11, 11a forming two equal compartments 20, 21. The floor sections 12, 12a are preferably formed integrally with the lateral wall sections 11, 11a with a continuous curved connecting portion which provides rounded corners therebetween so that cleaning thereof is simplified.

The inner lower ends of the floor sections 12, 12a are preferably spaced to provide a central opening in the cage body. A perforate removable floor member 27 is supported between the said inner ends of the floor sections 12, 12a by depending end flanges formed thereon. Along the longitudinal axis of the floor member 27 is formed a guide track means 28 which is adapted to slidably support the removable cage divider member 19. The upper portion of the divider member 19 is preferably slidably held by guide means 29 secured to the upper wall section 14 of the cage 10.

Extending downwardly from the lower surface of each floor section 12, 12a at a point substantially medially of each compartment 20, 21 is a vertically disposed spacing support member 23, 23a, respectively, which preferably extends lengthwise of the lower surface of the cage 10. The spacing support members 23, 23a have on their inner lateral surfaces guide track means 24, 24a which serve to slidably support a removable offal tray 25 which is suspended directly below the floor member 27 and the central opening between the ends of the floor sections 12, 12a of the cage 10.

The rear wall section 13 of the cage 10 which is preferably weldably connected to the side and floor sections of the cage has formed therein spaced engaging means which are adapted to engage support elements of a cage support means 40. In the form best illustrated in FIG. 5 of the drawing, the spaced engaging means comprise spaced apertures 30, 31 which are preferably disposed in vertical alignment with the spacing support members 23, 23a.

The doors 17, 18 are preferably hingedly mounted on frames 33, 34, respectively, which are integrally connected to the side, floor and top wall sections of the cage 10. The doors 17, 18 are also preferably provided with suitable latch means 35, 36, respectively, and have openings formed therein for mounting feeding containers 37, 37a and water bottles 38, 38a, respectively.

As shown in FIG. 2 of the drawing, a plurality of cages 10 are mounted on a movable cage support means 40 with the body section of the cages 10 being in superimposed supportive relationship while at the same time having all four sides of each cage accessible to provide maximum ventilation and opportunity for cleaning and viewing the interior of the cages. The cage support means 40 in the preferred form shown comprises a generally rectangular lower support frame 41, constructed preferably of angle iron sections 42, 42a and 43, 43a, respectively, weldably connected and preferably having roller means, such as casters 46, secured to the under surface thereof at the respective corners of the supporting frame 41. Extending upwardly from the opposite ends of one of the angle iron sections 42a are vertical support bars 47, 48 which can be angle irons or strips and which are preferably connected to each other by cross bars 50, 51. Each of the support bars 47, 48 have projecting outwardly from the inner surface thereof a plurality of support studs 52, 52a, respectively, which are in vertical alignment and each of the studs 52 of bar 47 is disposed opposite a stud 52a in bar 48. Each pair of oppositely disposed studs 52, 52a are adapted to engage the support means formed on the rear wall 13 of cage 10, which in the form illustrated consist of apertures 30, 31, respectively. As shown in FIG. 4 of the drawing, the stud 52 (and stud 52a) consists of a short shank portion 53 fixedly held in the support bar 47 which extend outwardly a short distance from the inner surface of the support bar 47 and terminates in an enlarged head portion 54. The enlarged head portion 54 is adapted to freely enter the enlarged opening 30a of the aperture 30 but cannot pass through the restricted upper portion 30b of aperture 30 when the cage 10 is supported thereon.

Each pair of oppositely disposed studs 52, 52a are spaced vertically a distance equal to the overall vertical height of the cage 10 so that successive cages can be mounted one over the other on the next higher pair of oppositely disposed studs while at the same time having the spacing members 23, 23a contacting the frame of the upper wall sections 14 of the next lower cage 10. In the foregoing manner a plurality of animal cages 10 can be mounted on a single support means 40 and a group of superimposed cages can be very conveniently moved from one location to another, as when transporting to and from a laboratory or to and from a cleaning station. If desired, the means for securing the cage 10 to the support bars 52, 52a can comprise a threadable or other detachable means to facilitate removing any given cage from the support means 40.

It is preferable that the interior width of the rectangular frame 41 be such that the spacing support members 23, 23a can be placed within the frame 41 with the spacing members 23, 23a receiving both lateral and horizontal support from the frame 41.

Figure 6:
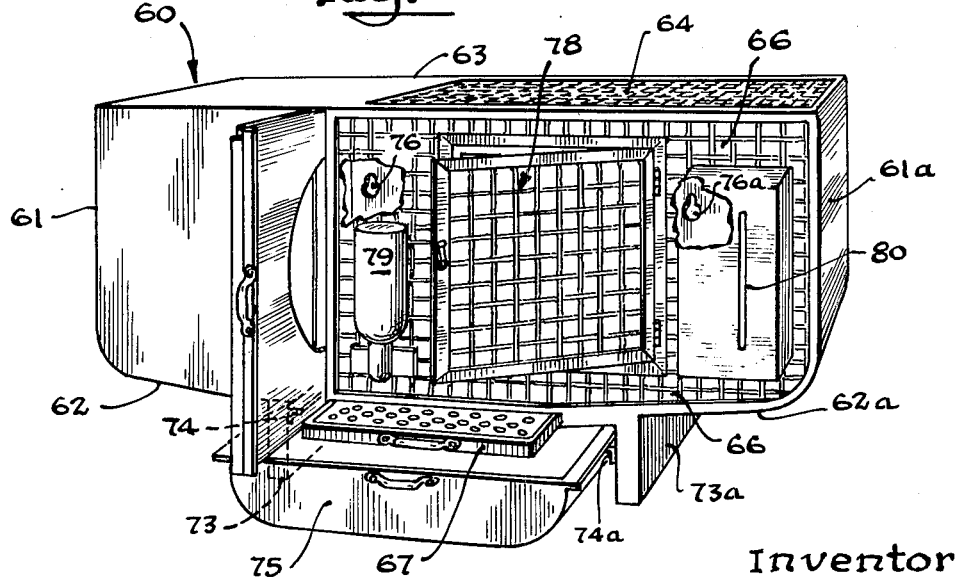
FIG. 6 is a perspective view of a modified form of the present invention.

The supporting means 40 can, if desired, be used with other animal cage forms. For example, an alternate form of animal cage which can be used with support means 40 is shown in FIG. 6 of the drawing, wherein the animal cage 60 has a generally rectangular cage body of the same general shape as cage 10 of FIGS. 1 and 5 and formed preferably by lateral wall sections 61, 61a, floor sections 62, 62a, rear wall section 63, top wall section 64, and front wall section 66. The floor sections 62, 62a are preferably formed integrally with the lower ends of the lateral wall sections 61, 61a to provide a continuous curved connecting portion forming rounded corners so that cleaning is simplified. The inner lower ends of the floor sections 62, 62a are also preferably spaced to provide a central opening in the cage body. A perforate removable floor member 67 is supported between the said inner ends of the floor sections 62, 62a by means of depending end flanges formed thereon.

Extending downwardly from the lower surface of each floor section 62, 62a is a vertically disposed spacing support member 73, 73a, respectively, which preferably extends lengthwise of the lower surface of the cage 60. The spacing support members 73, 73a have on their inner lateral surfaces guide track means 74, 74a, respectively, which serve to slidably support a removable offal tray 75 directly below the perforated floor member 67 and the central opening between the ends of the floor sections 62, 62a of the cage 60.

The rear wall section 63 of the cage 60 which is preferably weldably connected to the side and floor sections of the cage has formed therein spaced engaging means 76, 76a which are adapted to engage the support elements 52, 52a, respectively, of the cage support means 40, as previously described.

In the embodiment of the present invention shown in FIG. 6, the end portions of all the wall sections at one end of the cage 60 are preferably imperforate wall sections to provide an enclosure shielded from direct exposure to outside drafts and the like. The cage 60 also preferably has mounted at the inner ends of the imperforate wall sections a slidable partition member 81 supported by lower and upper guide flanges formed at the inner end of the floor section 62 and on the top wall 64 of the cage, respectively.

The front wall section 66 is also preferably provided with a hinged door 78, and opening for receiving a water bottle 79, and a food trough 80.

Others may practice the invention in any of the numerous ways which are suggested to one skilled in the art by this disclosure, and all such practice of invention are considered to be a part hereof which fall within the scope of the appended claims.

I claim:

1. An assembly of animal cages comprising in combination, a cage support means, a plurality of contiguous superimposed animal cage units each having an interconnected generally rectangular cage body, each said cage body having spaced engaging means formed on a wall thereof which are in detachable engagement with said cage support means, said cage support means having a lower cage supporting frame which receives a first cage thereon and having fixedly secured to one side of the supporting frame two spaced vertically extending cage support bars, each said cage support bars having a plurality of vertically aligned cage support elements at spaced points along the length thereof which are disposed opposite cage support elements on an adjacent cage support bar, and each pair of oppositely disposed cage support elements being in detachable supportive engagement with the said spaced engaging means formed on a wall of each of said cage bodies, said cage support elements being vertically spaced apart a distance equal to the overall vertical height of each cage; whereby a plurality of animal cages can be maintained assembled as a unitary group of superimposed cages and with each cage contacting an adjacent cage.

2. An assembly of animal cages as in claim 1, wherein said lower supporting frame has roller means secured to the lower surface thereof to enable said assembly of animal cages to be conveniently moved.

3. An assembly of animal cages as in claim 1, wherein each of said cage support elements consists of a stud member fixedly secured on said bar with a short shank portion extending upwardly therefrom and terminating in an enlarged head portion engageable with said spaced engaging means to hold said cage body removably associated with said cage support means.

4. An assembly of animal cages as in claim 1, wherein each said cage body has two spacing members extending downwardly from a lower surface thereof, and said spacing members are disposed inwardly of the sides of each said cage body and having the said spacing members of the lowermost cage in detachable supporting engagement with said cage support frame,

References Cited by the Examiner

UNITED STATES PATENTS

| | | | |
|---|---|---|---|
| 1,347,397 | 7/1920 | Newman | 119—17 |
| 1,947,698 | 2/1934 | Corbin | 119—19 |
| 2,388,157 | 10/1945 | Kerr | 119—17 X |
| 2,611,338 | 9/1952 | Yellin | 119—17 |
| 2,713,323 | 7/1955 | Marsh | 119—17 |
| 2,776,643 | 1/1957 | Simmons et al. | 119—17 |
| 2,857,880 | 10/1958 | Stone | 119—17 |
| 2,928,551 | 3/1960 | Abrams et al. | 211—149 |

SAMUEL KOREN, *Primary Examiner.*

HUGH R. CHAMBLEE, *Examiner.*